(12) United States Patent
Kashiwagi et al.

(10) Patent No.: US 7,845,673 B2
(45) Date of Patent: Dec. 7, 2010

(54) OCCUPANT LEG PORTION CONSTRAINING APPARATUS

(75) Inventors: Daisuke Kashiwagi, Tokyo (JP); Akira Kokeguchi, Tokyo (JP)

(73) Assignee: Takata Corporation, Tokyo (JP)

( * ) Notice: Subject to any disclaimer, the term of this patent is extended or adjusted under 35 U.S.C. 154(b) by 473 days.

(21) Appl. No.: 11/988,457

(22) PCT Filed: Jan. 16, 2007

(86) PCT No.: PCT/JP2007/050471

§ 371 (c)(1),
(2), (4) Date: Jan. 8, 2008

(87) PCT Pub. No.: WO2007/091404

PCT Pub. Date: Aug. 16, 2007

(65) Prior Publication Data

US 2010/0117341 A1   May 13, 2010

(30) Foreign Application Priority Data

Feb. 10, 2006   (JP) .............................. 2006-033498

(51) Int. Cl.
*B60R 21/16* (2006.01)
*B60R 21/20* (2006.01)
(52) U.S. Cl. .............. 280/730.1; 280/743.1; 280/743.2; 280/750; 280/751; 280/752
(58) Field of Classification Search .............. 280/728.2, 280/730.1, 743.1, 743.2, 752, 753, 750, 751
See application file for complete search history.

(56) References Cited

U.S. PATENT DOCUMENTS

| 6,916,039 B2 * | 7/2005 | Abe ........................... 280/729 |
| 7,201,395 B2 * | 4/2007 | Nagata et al. ............. 280/730.1 |
| 7,213,834 B2 | 5/2007 | Mizuno et al. |
| 7,226,075 B2 | 6/2007 | Nagata et al. |
| 7,314,232 B2 * | 1/2008 | Kashiwagi ................ 280/730.1 |
| 7,377,541 B2 * | 5/2008 | Abe et al. ................. 280/730.1 |
| 7,571,929 B2 * | 8/2009 | Fukawatase et al. ...... 280/730.1 |
| 2004/0262896 A1 * | 12/2004 | Mizuno et al. ........... 280/730.1 |

(Continued)

FOREIGN PATENT DOCUMENTS

JP   H07-069149   3/1995

*Primary Examiner*—Toan C To
(74) *Attorney, Agent, or Firm*—Manabu Kanesaka

(57) ABSTRACT

An occupant leg part restraint apparatus including a cover cloth for preventing an air bag inflated and developed under a steering column (steering column cover) from interfering with an auxiliary key, in which the cover cloth can be rapidly projected to the upper side of the air bag. A key device (4) is installed on the right side face of the steering column cover (2). The auxiliary key (6) is fitted in a suspended state to a key (5) inserted into the key device (4). The air bag (12) is provided with a cover cloth (14) which is projected from the right side upper end of the air bag (12) upward and interposed between the air bag (12) and the key device (4) when the air bag (12) is inflated. The cover cloth (14) includes an extension part (14a) extended laterally from the vertical intermediate part on the side of the cover cloth. The vertical intermediate part of the cover cloth (14) is connected to the upper end of the air bag (12) through the extension part (14a).

6 Claims, 3 Drawing Sheets

U.S. PATENT DOCUMENTS

2005/0151352 A1   7/2005   Abe et al.
2006/0071459 A1   4/2006   Hayakawa et al.
2008/0116669 A1 * 5/2008   Adachi et al. ............ 280/730.1

* cited by examiner

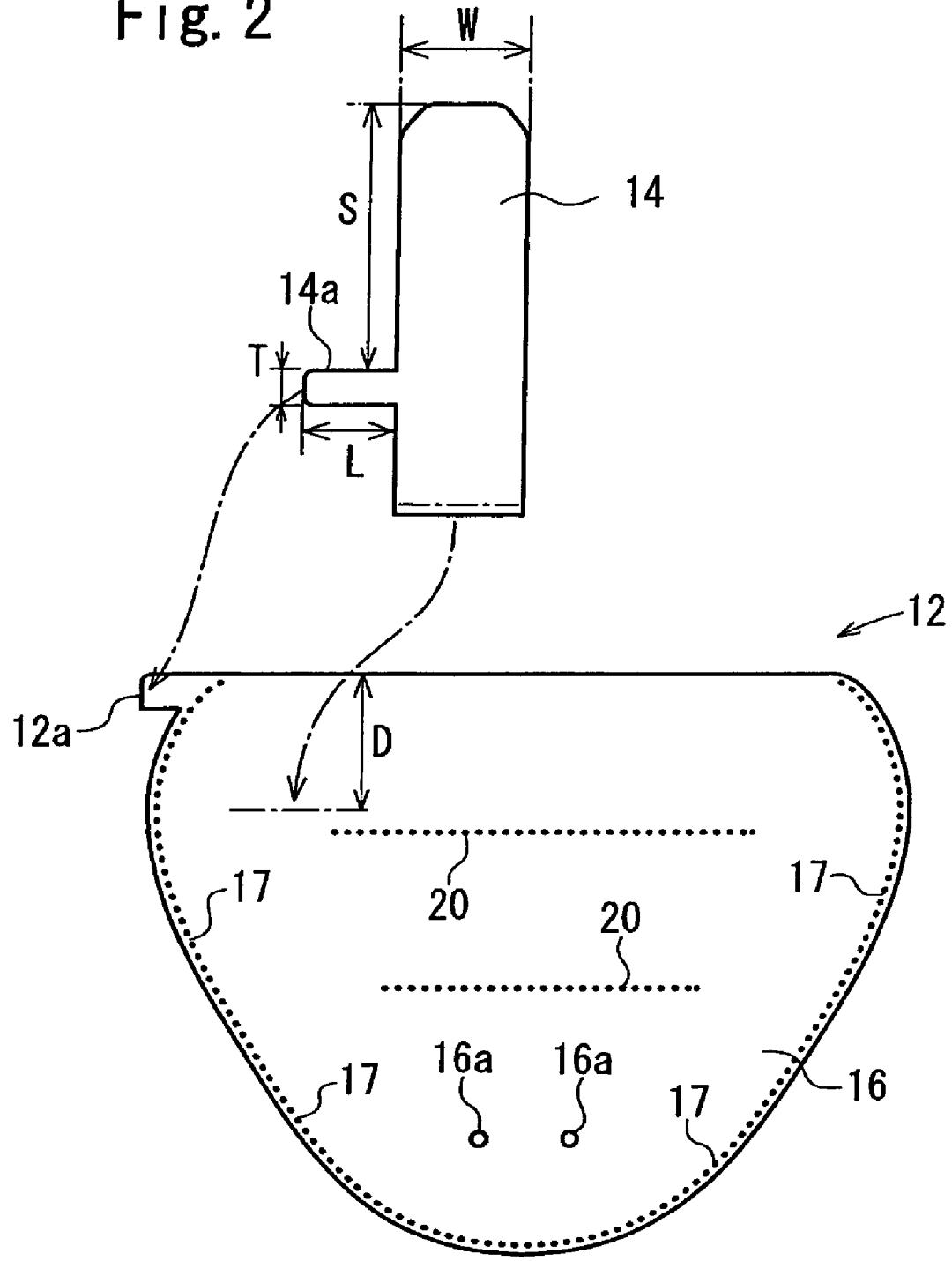

US 7,845,673 B2

OCCUPANT LEG PORTION CONSTRAINING APPARATUS

TECHNICAL FIELD

The present invention relates to a passenger or occupant leg portion constraining apparatus for constraining a leg portion of a passenger or occupant upon collision of a vehicle and, more specifically, to a leg portion constraining apparatus for a driver on a driver's seat.

BACKGROUND ART

There is a case in which a knee airbag apparatus for constraining a leg portion of a passenger upon collision is installed below a steering column of a vehicle. Upon collision of the vehicle, a gas generator is activated to inject gas, and the injected gas is supplied to an airbag to inflate and deploy the airbag in a space between the interior panel and lower legs of the passenger so that the leg portion of the passenger is constrained.

In Japanese Unexamined Patent Application Publication No. 2004-345530, there is described that the airbag is provided with a cover cloth in order to prevent direct interference of a key inserted into a key cylinder in a steering column cover or other keys attached thereto with the knee airbag.

Patent Document 1 Japanese Unexamined Patent Application Publication No. 2004-345530

DISCLOSURE OF INVENTION

It is an object of the present invention to provide a passenger leg portion constraining apparatus including a cover cloth for preventing interference between an airbag to be inflated and deployed below a steering column (steering column cover) and other keys attached thereto, in which the cover cloth is protruded quickly upward from the airbag.

The passenger leg portion constraining apparatus according to the present invention is a passenger leg portion constraining apparatus having an airbag which is arranged below the steering column and is capable of inflating upward along a space near a lower surface of a steering column cover, including a cover cloth provided on the airbag so as to protrude upward from an upper end portion of the airbag when the airbag is inflated and be interposed between the airbag and a key apparatus of a vehicle, the cover cloth being mounted at the proximal end side thereof to a surface on the side of an instrument panel of the airbag, characterized in that a vertical midsection of the cover cloth is connected to an upper portion of the airbag.

A configuration in which a protruding portion protruding from the vertical midsection of a side of the cover cloth sideward is provided and the protruding portion is connected to the upper portion of the airbag is also applicable.

BRIEF DESCRIPTION OF THE DRAWINGS

FIG. 2 is an exploded view of the airbag and a cover cloth.

BEST MODE FOR CARRYING OUT THE INVENTION

Figure 1A:
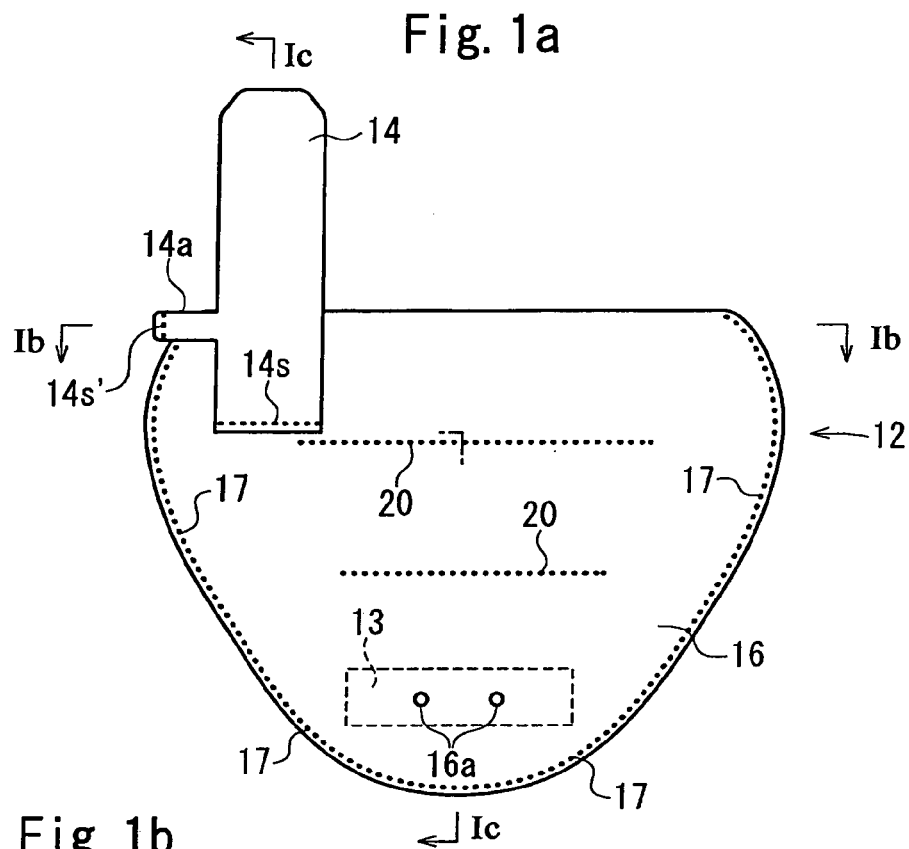
FIG. 1a is a front view of an airbag of a passenger leg portion constraining apparatus according to an embodiment.

According to the passenger leg portion constraining apparatus of the present invention, the cover cloth protrudes upward from an upper end portion of an airbag and is interposed between the airbag and a key apparatus when the airbag is inflated. Accordingly, direct interference between the airbag and attached keys is prevented.

According to the present invention, since a vertical midsection of a cover cloth is connected to an upper portion of the airbag, the cover cloth moves quickly by being pulled by the upper portion of the airbag, and protrudes upward.

When the protruding portion protruded from the vertical midsection of a side of the cover cloth is connected to the upper portion of the airbag, the cover cloth can extend easily from the proximal end thereof along a steering column cover.

Referring now to the drawings, an embodiment of the present invention will be described.

Figure 1B:
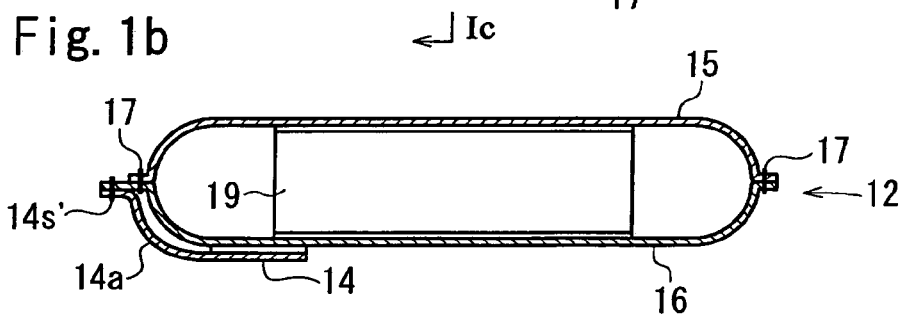
FIGS. 1b and 1c are cross-sectional views in FIG. 1a taken along the lines Ib-Ib and Ic-Ic respectively.
Figure 1C:
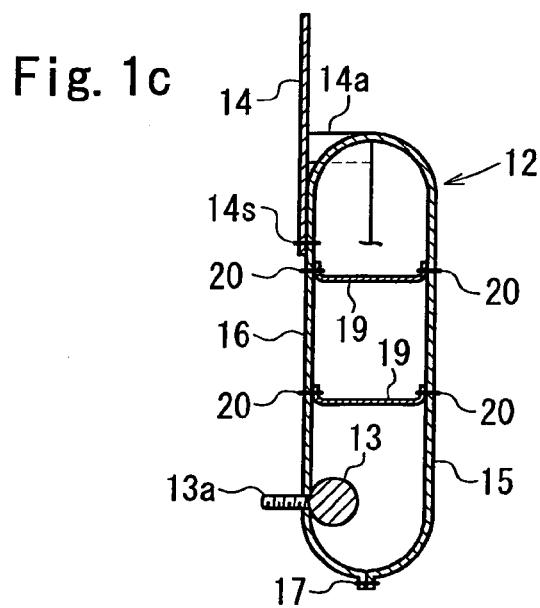
Figure 3:
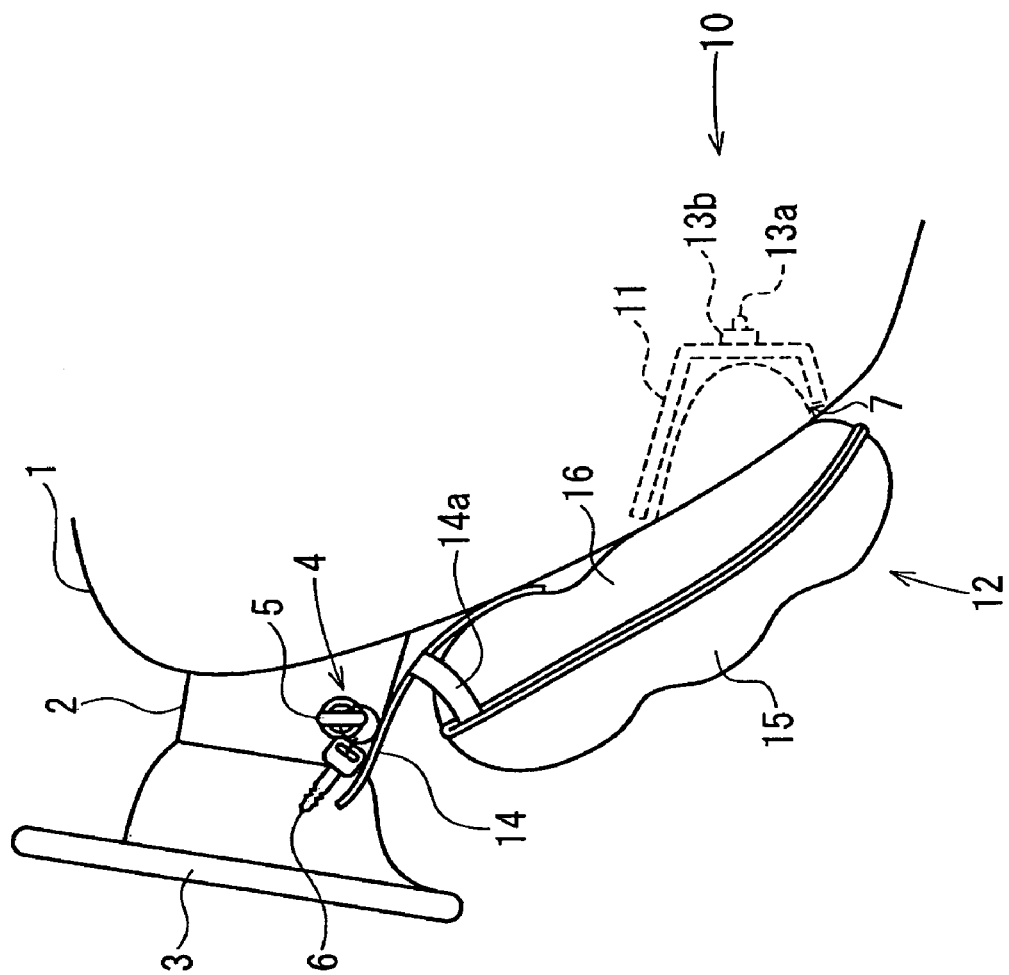
FIG. 3 is a side view of a space in front of a driver's sheet in a vehicle showing a state in which the airbag is inflated.

FIG. 1a is a front view of an airbag for a passenger leg portion constraining apparatus according to an embodiment of the present invention, FIG. 1b and FIG. 1c are cross-sectional views taken along the line Ib-Ib and Ic-Ic in FIG. 1a respectively, FIG. 2 is an exploded view of the airbag and a cover cloth and FIG. 3 is a side-view of a space in front of a driver's seat of a vehicle showing a state in which the airbag is inflated. In the description shown below, the lateral direction corresponds to the widthwise direction of a vehicle body.

As shown in FIG. 3, a steering column (not shown) protrudes from an instrument panel 1 in front of the driver's seat of the vehicle, and the steering column is surrounded by a steering column cover 2. A steering wheel 3 is secured to a steering shaft (not shown) projecting from the steering column.

In this embodiment, a key apparatus (key cylinder) 4 is provided on the right side portion (the right side portion when viewed from the driver's seat) of the steering column cover 2. A key 5 inserted into the key apparatus 4 has an attached key (in the present invention, the attached key also includes a key different from a key for a vehicle and accessories other than the key such as a key holder) 6 in a state of being suspended there from. The attached key 6 is suspended downward with respect to the lower surface of the steering column cover 2 in the normal state (in a state in which it is not pushed upward by a cover cloth 14 described later).

A passenger leg portion constraining apparatus 10 is installed below the steering column cover 2.

The passenger leg portion constraining apparatus 10 includes a case 11 of a container shape having an opening (reference numeral is not given) on the front surface (the surface on the passenger's side), a lid (not shown) which covers the opening, an airbag 12 connected to the interior of the case 11, and a gas inflator 13 for inflating the airbag 12.

The case 11 is arranged in an airbag inflation opening (not shown) provided in an area of the instrument panel 1 below the steering column cover 2. In the normal state, the airbag 12 is folded and is stored in the case 11, and the lid (not shown) is mounted to the opening on the front surface of the case 11 so as to cover the folded body of the airbag 12. The lid is configured to open by being pressed by the airbag 12 when the airbag 12 is inflated to release the airbag inflation opening.

The airbag 12 is inflated by gas from the gas generator 13 and, as shown in FIG. 3, is inflated toward the front surface of the instrument panel 1 via the airbag inflating opening, and then is deployed upward from below so as to extend from an area of the instrument panel 1 below the steering column cover 2 along the lower surface of the steering column cover 2.

In this embodiment, the airbag 12 has a shape increasing in lateral width (the widthwise direction of the vehicle body) from the lower side to the upper side as shown in FIG. 1*a*, and the lateral width of the upper portion of the airbag 12 is larger than the lateral width of the steering column cover 2. In a state in which the airbag 12 is inflated along the lower surface of the steering column cover 2, the laterally intermediate portion of the upper portion of the airbag 12 opposes the lower surface of the steering column cover 2, and the left side portion and the right side portion are expanded sideward from with respect to the left side portion and the right side portion of the steering column cover 2.

The terms "left" and "right" correspond to the left and right when viewing the airbag 12 from the passenger side, and in FIG. 1*a* and FIG. 2, which illustrate views from the side opposite from the passenger, the left and right are inverted. Hereinafter, the left and right are used on the basis of the view from the passenger.

The airbag 12 is provided with the cover cloth 14 which is protruded from the upper end portion of the airbag 12 upward to interpose between the airbag 12 and the key apparatus 4 when the airbag 12 is inflated. In this embodiment, the cover cloth 14 is arranged on the right side portion of the upper portion of the airbag 12.

In this embodiment, the airbag 12 includes a front surface 15 on the passenger side and a rear surface 16 on the instrument panel 1 side. In this embodiment, the airbag 12 is manufactured by two-folding a panel, which constitutes the front surface 15 on one half thereof and the rear surface 16 on the other half thereof, and stitching aligned peripheral edges of the front surface 15 and the rear surface 16. Reference numeral 17 designates a seam of the stitch.

As shown in FIG. 2, the cover cloth 14 is composed of a band-shaped panel provided separately from an outer shell of the airbag 12, that is, the panel which constitutes the front surface 15 and the rear surface 16. The cover cloth 14 is arranged on the rear surface 16 side with the direction of extension thereof oriented in the vertical direction, and the lower end side, that is, the proximal end side is attached by stitching to the upper portion of the right side portion of the rear surface 16. Reference numeral 14*s* designates a seam of the stitch.

The cover cloth 14 is provided with a protruding portion 14*a* which protrudes rightward from a vertically midsection of the right side thereof. In this embodiment, the protruding portion 14*a* is formed into a band shape and is protruded rightward from the right side of the cover cloth 14 at a substantially right angle. As shown in FIG. 2, a lug 12*a* for connecting the protruding portion is protruded from the right end side of the upper side of the airbag 12. The distal end side of the protruding portion 14*a* is attached to the lug 12*a* by stitching, the vertically midsection of the cover cloth 14 is connected to the upper end portion of the airbag 12 via the protruding portion 14*a* and the lug 12*a*. The reference numeral 14*s*' designates a seam stitching the protruding portion 14*a* and the lug 12*a*.

As shown in FIG. 2, the lower end side of the cover cloth 14 is preferably attached to the rear surface 16 by stitching at a position apart from the upper side (the seam 17 along the upper side) of the rear surface 16 downwardly in a state in which the airbag 12 is deployed flatly. A distance D from the upper side of the rear surface 16 to the stitching portion is preferably from 30 to 200 mm, more specifically, from 100 to 150 mm.

A distance S (FIG. 2) from the upper end portion of the cover cloth 14 to a connecting position of the cover cloth 14 to the upper end portion of the airbag (the position to arrange the protruding portion 14*a*) is preferably from 50 to 120 mm, more specifically, from 150 to 200 m.

A lateral width W of the cover cloth 14 is preferably from 30 to 300 mm, more specifically, from 120 to 200 mm.

A sideward protruding length L (FIG. 2) of the protruding portion 14*a* from the side of the cover cloth 14 is preferably from 10 to 200 mm, more specifically, from 30 to 150 mm. The vertical width T (FIG. 2) of the protruding portion 14*a* is preferably from 10 to 100 mm, more specifically, from 20 to 50 mm.

The material of the cover cloth 14 is not specifically limited.

In this embodiment, as shown in FIG. 1*c*, a tether 19 for restraining the thickness of inflation of the airbag 12 by connecting the front surface 15 and the rear surface 16 is provided in the interior of the airbag 12. Reference numeral 20 designates a seam which attaches both end portions of the tether 19 in the direction of the thickness of the airbag respectively to the front surface 15 and the rear surface 16. In this embodiment, the tether 19 extends continuously in the lateral direction, and a plurality of tethers are provided in multiple levels (two levels in this embodiment). The both lateral end portions of the respective tethers 19 are apart from the left and right sides of the airbag 12, and an air ventilation space is formed there between.

The gas inflator 13 is arranged in the interior of the airbag 12. A stud bolt 13*a* is protruded from the gas inflator 13 or from a holder (not shown) which holds the same. The stud bolt 13*a* is inserted through an insertion hole 16*a* provided in the portion near the lower end portion of the rear surface 16 and an insertion hole (not shown) provided on the rear surface of the case 11 respectively, and a nut 13*b* is tightened on the stud bolt 13*a*, so that the gas inflator 13 and the portion near the lower end of the rear surface 16 are fixed to the case 11.

Subsequently, the airbag 12 is folded and stored in the interior of the case 11, and the lid is mounted to the case 11, so that the passenger leg portion constraining apparatus 10 is configured.

When the vehicle having the passenger leg portion constraining apparatus 10 in this configuration collides, the gas inflator 13 is activated to inject gas, and the airbag 12 starts to be inflated. The airbag 12 is firstly inflated toward the front surface of the instrument panel 1 via an airbag inflation opening 7 while pushing and opening the lid, and then is deployed upwardly along the front surface of the instrument panel 1.

In this case, as shown in FIG. 3, the cover cloth 14 protrudes upward from the upper end portion of the right side portion of the airbag 12, and is interposed between the airbag 12 and the key apparatus 4. Accordingly, direct interference between the airbag 12 and the key 5 or the attached key 6 is prevented.

According to the passenger leg portion constraining apparatus 10, since the vertically midsection of the cover cloth 14 is connected to the upper end portion of the airbag 12 via the protruding portion 14*a*, the cover cloth 14 is moved quickly by being pulled by the upper end portion of the airbag 12 and is protruded upward.

The embodiment shown above is only an example of the present invention, and the present invention is not limited to the configuration shown in the drawings.

For example, the protruding portion may be configured integrally with the cover cloth, and may be configured separately and attached to the cover cloth later. The protruding portion may be of a shape other than the band shape. The protruding portion may be provided at a midsection of the left side of the cover cloth. The cover cloth may be connected to the upper end portion of the airbag by connecting means other than the protruding portion.

The configuration of the peripheral members of the steering and the airbag may be laterally inverted from the embodiment shown above.

The present application is based on Japanese Patent Application (Japanese Patent Application No. 2006-033498) as of Feb. 10, 2006, and the entire part thereof is incorporated herein by reference.

The invention claimed is:

1. An occupant leg portion constraining apparatus, comprising:
   an airbag, which is adapted to be arranged below a steering column and under a key apparatus of a vehicle and to be capable of inflating upward along a panel and a steering column cover,
   a cover cloth provided on the airbag so as to protrude upward from an upper end portion of the airbag and to be interposed between the airbag and the key apparatus when the airbag is inflated, the cover cloth being adapted to be mounted at a proximal end side thereof on a side of the panel; and
   a protruding portion protruding from a vertical midsection of a side of the cover cloth sideward, the protruding portion being connected to an upper portion of the airbag.

2. The occupant leg portion constraining apparatus according to claim 1, wherein the protruding portion is connected to the upper end portion of the airbag.

3. The occupant leg portion constraining apparatus according to claim 2, further comprising a lug provided on a left end or a right end of the upper end of the airbag, wherein the protruding portion is connected to the lug.

4. The occupant leg portion constraining apparatus according to claim 1, wherein a distance from the upper end of the cover cloth to the protruding portion is from 50 to 120 m.

5. The occupant leg portion constraining apparatus according to claim 1, wherein a lateral width of the cover cloth is from 30 to 300 mm.

6. The occupant leg portion constraining apparatus according to claim 1, wherein a distance from a connecting portion between a proximal end of the cover cloth and the airbag to an upper end of the airbag is from 30 to 200 mm.

* * * * *